US012790485B2

(12) United States Patent
Gu et al.

(10) Patent No.: US 12,790,485 B2
(45) Date of Patent: Nov. 10, 2026

(54) NON-BLOOMING THERMOPLASTIC POLYURETHANE COMPOUNDS AND THERMOPLASTIC ARTICLES MOLDED THEREFROM

(71) Applicants: Avient Corporation, Avon Lake, OH (US); GLS Thermoplastic Alloys (Suzhou) Co., Ltd., Avon Lake, OH (US)

(72) Inventors: Jiren Gu, Crystal Lake, IL (US); Hanxing Wei, Suzhou (CN)

(73) Assignee: Avient Corporation, Avon Lake, OH (US)

( * ) Notice: Subject to any disclaimer, the term of this patent is extended or adjusted under 35 U.S.C. 154(b) by 1153 days.

(21) Appl. No.: 17/265,348

(22) PCT Filed: Aug. 3, 2018

(86) PCT No.: PCT/CN2018/098437
§ 371 (c)(1),
(2) Date: Feb. 2, 2021

(87) PCT Pub. No.: WO2020/024242
PCT Pub. Date: Feb. 6, 2020

(65) Prior Publication Data
US 2021/0309854 A1 Oct. 7, 2021

(51) Int. Cl.

| | |
|---|---|
| ***C08L 75/08*** | (2006.01) |
| ***B29B 11/06*** | (2006.01) |
| ***B29C 45/00*** | (2006.01) |
| ***B29C 45/14*** | (2006.01) |
| ***B29K 21/00*** | (2006.01) |
| ***B29K 101/12*** | (2006.01) |
| ***B32B 27/08*** | (2006.01) |
| ***B32B 27/28*** | (2006.01) |
| ***B32B 27/36*** | (2006.01) |
| ***B32B 27/40*** | (2006.01) |
| ***C08L 75/06*** | (2006.01) |

(52) U.S. Cl.
CPC .............. *C08L 75/08* (2013.01); *B29B 11/06* (2013.01); *B29C 45/0001* (2013.01); *B29C 45/14* (2013.01); *B32B 27/08* (2013.01); *B32B 27/283* (2013.01); *B32B 27/285* (2013.01); *B32B 27/36* (2013.01); *B32B 27/40* (2013.01); *C08L 75/06* (2013.01); *B29K 2021/003* (2013.01); *B29K 2101/12* (2013.01); *B32B 2250/24* (2013.01); *B32B 2270/00* (2013.01); *B32B 2274/00* (2013.01); *B32B 2307/536* (2013.01); *B32B 2307/712* (2013.01); *B32B 2457/00* (2013.01); *B32B 2509/00* (2013.01); *B32B 2605/00* (2013.01)

(58) Field of Classification Search
None
See application file for complete search history.

(56) References Cited

U.S. PATENT DOCUMENTS

| | | | | |
|---|---|---|---|---|
| 4,481,323 | A * | 11/1984 | Sterling | A61L 29/049 524/505 |
| 4,511,354 | A * | 4/1985 | Sterling | A61L 29/049 128/207.15 |
| 4,552,914 | A * | 11/1985 | Sterling | C08L 53/025 524/505 |
| 5,231,159 | A | 7/1993 | Patterson et al. | |
| 5,491,211 | A | 2/1996 | Rieck et al. | |
| 5,610,223 | A * | 3/1997 | Mason | C08L 67/02 525/66 |
| 6,153,691 | A * | 11/2000 | Gornowicz | C08L 53/025 525/453 |
| 6,458,880 | B1 * | 10/2002 | Onder | C08G 18/664 524/451 |
| 9,085,784 | B1 * | 7/2015 | Herrema | C12P 7/625 |
| 9,249,291 | B2 * | 2/2016 | Qian | C08L 75/04 |
| 9,388,312 | B2 * | 7/2016 | Bhatia | C08L 77/02 |
| 10,253,180 | B2 * | 4/2019 | Boucard | C08L 83/00 |
| 10,836,908 | B2 * | 11/2020 | Bruce | C08K 3/34 |
| 2003/0109623 | A1 * | 6/2003 | Gornowicz | C08G 77/458 524/492 |
| 2005/0065311 | A1 * | 3/2005 | Agrawal | C08L 27/06 528/88 |
| 2005/0119410 | A1 * | 6/2005 | DeLucia | C08L 53/02 525/100 |
| 2006/0058471 | A1 | 3/2006 | Szekely | |
| 2007/0029702 | A1 * | 2/2007 | Peterson | B32B 15/08 264/259 |
| 2008/0177000 | A1 * | 7/2008 | Ahn | C08K 5/0008 525/474 |
| 2010/0160545 | A1 * | 6/2010 | Page | C08G 18/48 525/123 |
| 2011/0046306 | A1 | 2/2011 | Serhatkulu | |

(Continued)

FOREIGN PATENT DOCUMENTS

| | | |
|---|---|---|
| CN | 1568351 A | 1/2005 |
| CN | 101959920 A | 1/2011 |

(Continued)

OTHER PUBLICATIONS

"Structure-microhardness correlatoin of polymers and blends:" (F.J. Balta Calleja) (https://digital.csic.es/bitstream/10261/242314/1/Structure-microhardness%20correlation.pdf) printed Mar. 9, 2024.*

(Continued)

*Primary Examiner* — Kevin R Kruer
(74) *Attorney, Agent, or Firm* — Calfee, Halter & Griswold LLP

(57) ABSTRACT

Thermoplastic elastomer compounds include (a) at least about 40 weight percent of thermoplastic polyurethane selected from polycaprolactone-type thermoplastic polyurethane, polyether-type thermoplastic polyurethane, and combinations thereof, and (b) at most about 5 weight percent of polysiloxane. The thermoplastic elastomer compounds can be molded into thermoplastic articles which exhibit substantially no blooming after weathering, while also exhibiting good processability, useful functionality, and desirable aesthetics. The thermoplastic compounds can be especially useful for making overmolded thermoplastic articles.

15 Claims, No Drawings

(56) References Cited

U.S. PATENT DOCUMENTS

| | | | | |
|---|---|---|---|---|
| 2011/0112270 | A1* | 5/2011 | Meltzer | C08G 18/664 528/85 |
| 2011/0152459 | A1* | 6/2011 | Berg | C08K 9/06 525/474 |
| 2012/0073858 | A1 | 3/2012 | Vanhalle et al. | |
| 2012/0108136 | A1* | 5/2012 | Elia | C08J 5/043 428/221 |
| 2013/0102723 | A1 | 4/2013 | Wamprecht et al. | |
| 2013/0338279 | A1 | 12/2013 | Vanhalle et al. | |
| 2014/0011898 | A1 | 1/2014 | Qian et al. | |
| 2015/0104598 | A1* | 4/2015 | Bhatia | C08L 77/06 521/134 |
| 2016/0032091 | A1* | 2/2016 | Ellul | C08L 23/22 525/63 |
| 2017/0233572 | A1* | 8/2017 | Boucard | C08K 3/36 524/500 |
| 2020/0216668 | A1* | 7/2020 | Bruce | C08L 23/06 |
| 2020/0385578 | A1* | 12/2020 | Gu | B32B 27/302 |
| 2021/0309854 | A1* | 10/2021 | Gu | B32B 27/36 |
| 2022/0372304 | A1* | 11/2022 | Fisher | C09D 5/004 |
| 2023/0310718 | A1* | 10/2023 | Davison | C08L 75/04 424/424 |
| 2024/0265831 | A1* | 8/2024 | Ishimaru | B32B 7/12 |

FOREIGN PATENT DOCUMENTS

| | | | | |
|---|---|---|---|---|
| CN | 102015897 | A | 4/2011 | |
| CN | 102482448 | A | 5/2012 | |
| CN | 102753595 | A | 10/2012 | |
| CN | 102786652 | A | 11/2012 | |
| CN | 103073875 | A | 5/2013 | |
| CN | 103492470 | A | 1/2014 | |
| CN | 103756236 | A | 4/2014 | |
| CN | 104761884 | A | 7/2015 | |
| CN | 105670096 | A | 6/2016 | |
| CN | 105670274 | A | 6/2016 | |
| CN | 106084751 | A | 11/2016 | |
| CN | 106795369 | A | 5/2017 | |
| CN | 107636069 | A | 1/2018 | |
| CN | 108034226 | A | 5/2018 | |
| JP | 60245621 | A | 12/1985 | |
| JP | 2003221504 | A | 8/2003 | |
| JP | 2005154670 | A | 6/2005 | |
| JP | 2017078131 | A | 4/2017 | |
| WO | 2009094332 | A2 | 7/2009 | |
| WO | 2009132947 | A1 | 11/2009 | |
| WO | 2010142519 | A1 | 12/2010 | |
| WO | 2015000722 | A1 | 1/2015 | |
| WO | 2015140147 | A1 | 9/2015 | |
| WO | 2016035865 | A1 | 3/2016 | |
| WO | WO-2016184845 | A1 * | 11/2016 | B29C 43/003 |
| WO | 2017021164 | A1 | 2/2017 | |
| WO | 2017040505 | A1 | 3/2017 | |

OTHER PUBLICATIONS

Balta Calleja, Structure-Microhardness Correlation of Polymers and Blends, pp. 1-21.

Dow Corning, DOW CORNING® MB40-006 Masterbatch, Product Information, Jan. 2001, pp. 1-2.

Huntsman, A guide to thermoplastic polyurethanes (TPU), 2010, pp. 1-26.

Yilgör et al., Silicone Surfactants, Part V: Siloxane copolymers as surface modifying additives for polymers, Tenside Surf. Det. 30, 1993, pp. 158-164, München, Germany.

* cited by examiner

NON-BLOOMING THERMOPLASTIC POLYURETHANE COMPOUNDS AND THERMOPLASTIC ARTICLES MOLDED THEREFROM

FIELD OF THE INVENTION

This invention relates to thermoplastic elastomer compounds including thermoplastic polyurethane as the primary thermoplastic resin and which exhibit substantially no blooming when molded into thermoplastic articles.

BACKGROUND OF THE INVENTION

Demand exists for thermoplastic articles in a variety of markets and product applications. Non-limiting examples include consumer products, electronics and their accessories, automotive and transportation, and healthcare and medical. In many markets and product applications, the aesthetics of a thermoplastic article, such as its "look" and "feel", can be just as important as the functionality of the thermoplastic article.

The aesthetics of a thermoplastic article can be negatively affected by "blooming", which is a well-known phenomenon in the field of thermoplastics. Blooming typically manifest as a visible haze, discoloration, or residue, such as a white spot, on the surface of a thermoplastic article. In general, blooming is caused by phase separation of one or more of the components in the thermoplastic material used to mold the thermoplastic article.

Blooming can be especially prevalent when thermoplastic articles are molded from thermoplastic polyurethanes (TPU). A subset of thermoplastic elastomer (TPE) materials, TPU offer functionality such as good abrasion resistance and chemical resistance, which is useful for a variety of product applications. However, when formulations of thermoplastic materials include TPU as the primary thermoplastic resin, thermoplastic articles molded from such thermoplastic materials can be especially susceptible to blooming.

It is believed blooming can occur for at least several reasons when thermoplastic articles are molded from TPU. For example, it is believed that TPU oligomer, which is inherently present with the TPU polymer as a result of processing, can migrate to the surface of a thermoplastic article over time because the TPU oligomer has a lower molecular weight than that of the TPU polymer. It is also believed that waxes, which often are used as mold release agents with TPU and as such are intended to migrate to the surface of the thermoplastic article to facilitate its release from the mold, can cause blooming. It is further believed that other additives, such as antioxidants, ultraviolet light absorbers, and the like, can migrate to the surface of the thermoplastic article over time. Moreover, it is believed blooming can be dependent on environmental conditions and can become more severe over time at elevated humidity and temperature.

SUMMARY OF THE INVENTION

Consequently, a need exists for thermoplastic elastomer compounds including TPU as the primary thermoplastic resin and which exhibit substantially no blooming when molded into thermoplastic articles, while also exhibiting good processability, useful functionality, and desirable aesthetics.

The aforementioned needs are met by one or more aspects of the present invention.

One aspect of the invention is thermoplastic elastomer compounds including (a) at least about 40 weight percent, by weight of the compound, of thermoplastic polyurethane selected from polycaprolactone-type thermoplastic polyurethane, polyether-type thermoplastic polyurethane, and combinations thereof, and (b) at most about 5 weight percent, by weight of the compound, of polysiloxane.

Another aspect of the invention is thermoplastic articles molded from the thermoplastic elastomer compounds as described herein.

A further aspect of the invention is overmolded thermoplastic articles including (a) an overmold portion molded from the thermoplastic elastomer compounds as described herein; and (b) a substrate portion molded from a thermoplastic resin compound comprising thermoplastic polymer resin. The overmold portion is bonded onto the substrate portion at a bond interface, and the bond interface is free of adhesive.

An even further aspect of the invention is methods of making overmolded thermoplastic articles which have a substrate portion and an overmold portion. The methods include the steps of (a) providing the thermoplastic elastomer compound as described herein, (b) providing a thermoplastic resin compound comprising thermoplastic polymer resin, (c) molding the thermoplastic resin compound to provide the substrate portion, and (d) overmolding the thermoplastic elastomer compound to provide the overmold portion. The overmold portion is bonded onto the substrate portion at a bond interface, and the bond interface is free of adhesive, thereby providing the overmolded thermoplastic article.

According to aspects of the invention, the thermoplastic elastomer compounds as described herein can be molded into thermoplastic articles which exhibit substantially no blooming after weathering, while also exhibiting good processability, useful functionality, and desirable aesthetics. The thermoplastic compounds as described herein can be especially useful for making overmolded thermoplastic articles.

Features of the invention will become apparent with reference to the following embodiments. There exist various refinements of the features noted in relation to the above-mentioned aspects of the present invention. Additional features may also be incorporated in the above-mentioned aspects of the present invention. These refinements and additional features may exist individually or in any combination. For instance, various features discussed below in relation to any of the described aspects of the present invention may be incorporated into any of the described aspects of the present invention alone or in any combination.

EMBODIMENTS OF THE INVENTION

In some embodiments, the invention is directed to thermoplastic elastomer compounds.

In other embodiments, the invention is directed to thermoplastic articles.

In further embodiments, the invention is directed to overmolded thermoplastic articles.

In even further embodiments, the invention is directed to methods of making overmolded thermoplastic articles.

Required and optional features of these and other embodiments of the present invention are described.

As used herein, the term "4-Cycle Weathering Test" means the weathering of a test specimen using a Model SH-642 environmental test chamber available from ESPEC Corporation for the sequence of test cycles and weathering conditions as follows:

| Cycle | 1 | 2 | 3 | 4 |
|---|---|---|---|---|
| Temperature (° C.) | 30 | 35 | 35 | 70 |
| Relative humidity (%) | 85 | 85 | 95 | 95 |
| Duration (days) | 7 | 7 | 7 | 7 |

As used herein, the term "blooming" means phase separation of one or more of the components in a thermoplastic elastomer compound from the polymer matrix of the thermoplastic elastomer compound and which manifests as a haze, discoloration, residue, or similar defect. In some embodiments, blooming is detectable by visual observation on the surface of a thermoplastic article molded from the thermoplastic elastomer compound. In other embodiments, blooming is detectable by Fourier transform infrared (FT-IR) spectroscopy on the surface of a thermoplastic article molded from the thermoplastic elastomer compound. In further embodiments, blooming is detectable by both visual observation and Fourier transform infrared (FT-IR) spectroscopy on the surface of a thermoplastic article molded from the thermoplastic elastomer compound.

As used herein, the term "compound" means a composition or mixture resulting from melt mixing, or compounding, a neat polymer and at least one other ingredient including but not limited to one or more additives, or one or more other polymers, or both.

As used herein, the term "free of" a certain component or substance means, in some embodiments, that no amount of that component or substance is intentionally present, and, in other embodiments, that no functionally effective amount of that component or substance is present, and, in further embodiments, that no amount of that component or substance is present.

As used herein, the term "molded from" means, with respect to an article (or component of an article) and a material, that the article (or component of the article) is molded, shaped, formed, or otherwise made from the material. As such, the term "molded from" means, in some embodiments, the article (or component of an article) can comprise, consist essentially of, or consist of, the material; and, in other embodiments, the article (or component of an article) consists of the material because the article (or component of an article) is, for example, made by an injection molding process.

As used herein, the term "Parallel Plate Rheometer Method" means the method for determining the crystallization temperature (Tc) of a test specimen by using a parallel plate rheometer model DHR-2 Discovery Hybrid Rheometer available from TA Instruments to record the storage modulus (E') of the test specimen as it is cooled from 200° C. to 50° C. at a rate of 10° C./minute and assigning the temperature at which occurs an inflection point in the change in the storage modulus (E') to be the crystallization temperature (Tc) of the test specimen.

As used herein, the term "visual observation" (including "visually observable" and other like terms) means an observation made (or observable) by an unaided human eye under common interior lighting conditions at a distance no greater than 50 centimeters from the unaided human eye.

Thermoplastic Elastomer Compounds

Some aspects of the invention are directed to thermoplastic elastomer compounds.

Thermoplastic elastomer compounds include (a) at least about 40 weight percent, by weight of the compound, of thermoplastic polyurethane selected from polycaprolactone-type thermoplastic polyurethane, polyether-type thermoplastic polyurethane, and combinations thereof, and (b) at most about 5 weight percent, by weight of the compound, of polysiloxane. In some embodiments, the thermoplastic elastomer compounds further include optional secondary elastomer and/or optional additives.

In some embodiments, the thermoplastic elastomer compound has a crystallization temperature of at least about 150° C. according to the Parallel Plate Rheometer Method. In other embodiments, the thermoplastic elastomer compound has a crystallization temperature of at least about 165° C. according to the Parallel Plate Rheometer Method. In further embodiments, the thermoplastic elastomer compound has a crystallization temperature from about 165 to about 195° C., or from about 170 to about 190° C., according to the Parallel Plate Rheometer Method.

In some embodiments, the thermoplastic polyurethane has a first hardness, the optional secondary elastomer is present and has a second hardness, and the compound has a third hardness, wherein the first hardness is greater than the second hardness, and wherein the third hardness is less than the first hardness and greater than the second hardness.

In some embodiments, the thermoplastic elastomer compound has a Shore A hardness of less than about 90, or less than about 85, or less than about 80, according to ASTM D2240.

Thermoplastic Polyurethane

According to the invention, thermoplastic elastomer compounds include thermoplastic polyurethane (TPU).

TPU suitable for use in the present invention are selected from polycaprolactone-type thermoplastic polyurethane, polyether-type thermoplastic polyurethane, and combinations thereof.

In general, TPU are block copolymers generally consisting of alternating sequences of hard segments and soft segments formed by the reaction of a polyol and a diisocyanate and, optionally, a chain extender.

As used herein, a "polycaprolactone-type thermoplastic polyurethane" means a type of thermoplastic polyurethane that is a reaction product of reactants including polycaprolactone polyol and diisocyanate and, optionally, chain extender. That is, the soft segments in polycaprolactone-type thermoplastic polyurethanes are polycaprolactone-based segments.

As used herein, a "polyether-type thermoplastic polyurethane" means a type of thermoplastic polyurethane that is a reaction product of reactants including polyether polyol and diisocyanate and, optionally, chain extender. That is, the soft segments in polyether-type thermoplastic polyurethanes are polyether-based segments.

In some embodiments, suitable TPU are selected from polycaprolactone-type thermoplastic polyurethane, for example, polycaprolactone copolyester thermoplastic polyurethane.

Furthermore, suitable polycaprolactone-type thermoplastic polyurethane and polyether-type thermoplastic polyurethane can have hard segments based on aromatic chemistries or aliphatic chemistries.

The term "aromatic" refers to TPU derived from mononuclear aromatic hydrocarbon groups or polynuclear aromatic hydrocarbon groups. The term includes those TPU derived from arylene groups. The term "arylene group" means a divalent aromatic group.

The term "aliphatic" refers to TPUs derived from saturated or unsaturated, linear, branched, or cyclic hydrocarbon groups. This term is used to encompass those TPUs derived from alkylene (e.g., oxyalkylene), aralkylene, and cycloalkylene (e.g., oxycycloalkylene) groups, for example. The term "alkylene group" means a saturated, linear or branched, divalent hydrocarbon group. Particularly preferred alkylene groups are oxyalkylene groups. The term "oxyalkylene group" means a saturated, linear or branched, divalent hydrocarbon group with a terminal oxygen atom. The term "aralkylene group" means a saturated, linear or branched, divalent hydrocarbon group containing at least one aromatic group. The term "cycloalkylene group" means a saturated, linear or branched, divalent hydrocarbon group containing at least one cyclic group. The term "oxycycloalkylene group" means a saturated, linear or branched, divalent hydrocarbon group containing at least one cyclic group and a terminal oxygen atom.

Consequently, suitable TPU are selected from aromatic polycaprolactone-type thermoplastic polyurethane, aliphatic polycaprolactone-type thermoplastic polyurethane, aromatic polyether-type thermoplastic polyurethane, aliphatic polyether-type thermoplastic polyurethane, and combinations thereof.

In some embodiments, suitable TPU are selected from aromatic polycaprolactone-type thermoplastic polyurethane, for example, aromatic polycaprolactone copolyester thermoplastic polyurethane.

Polycaprolactone-type thermoplastic polyurethanes suitable for use in the present invention include any conventional or commercially available polycaprolactone-type thermoplastic polyurethanes.

Non-limiting examples of commercially available polycaprolactone-type thermoplastic polyurethanes include those available under the PEARLTHANE brand from Lubrizol including grades such as PEARLTHANE 11T85; and the IROGRAN brand from Huntsman including grades such as IROGRAN A89E 4372.

Polyether-type thermoplastic polyurethanes suitable for use in the present invention include any conventional or commercially available polyether-type thermoplastic polyurethanes.

Non-limiting examples of commercially available polyether-type thermoplastic polyurethanes include those available under the IROGRAN brand from Huntsman including grades such as IROGRAN A85A 4394UV.

According to the invention, suitable TPU is present in the thermoplastic elastomer compound in an amount of at least about 40 weight percent by weight of the compound. In some embodiments, suitable TPU is present in the thermoplastic elastomer compound in an amount of at least about 50 weight percent, or about 60 weight percent, or about 70 weight percent, or about 80 weight percent, or about 90 weight percent, or about 95 weight percent, or about 99 weight percent, by weight of the compound.

Polysiloxane

According to the invention, thermoplastic elastomer compounds include polysiloxane. More commonly, polysiloxanes can be referred to as silicones.

Suitable polysiloxanes include conventional or commercially available polysiloxanes that sufficiently facilitate demolding of the thermoplastic article molded from the thermoplastic elastomer compound while also reducing or substantially eliminating undesirable blooming. A polysiloxane can be used alone or in combination with one or more other polysiloxanes.

In some embodiments, the polysiloxane is selected from non-functional polysiloxanes, functional polysiloxanes, and combinations thereof.

In some embodiments, the polysiloxane is a non-functional polysiloxane having a viscosity at 25° C. of about 50 cSt or less. Such polysiloxanes can be characterized as low viscosity non-functional polysiloxane fluids.

Non-limiting examples of commercially available low viscosity non-functional polysiloxane fluids include the XIAMETER PMX-200 (50CS) brand and grade designation available from Dow Corning.

In other embodiments, the polysiloxane is a non-functional polysiloxane having a viscosity at 25° C. of about 350 cSt or less. Such polysiloxanes can be characterized as medium viscosity non-functional polysiloxane fluids.

Non-limiting examples of commercially available medium viscosity non-functional polysiloxane fluids include the XIAMETER PMX-200 (350CS) brand and grade designation available from Dow Corning.

In embodiments of the invention in which the polysiloxane is a low viscosity or medium viscosity non-functional polysiloxane fluid, the polysiloxane is generally present in an amount ranging from about 0.2 to about 4 weight percent by weight of the thermoplastic elastomer compound. In certain embodiments of the invention in which the polysiloxane is a low viscosity or medium viscosity non-functional polysiloxane fluid, the polysiloxane is present in an amount ranging from about 0.5 to about 1.5 weight percent by weight of the thermoplastic elastomer compound.

In further embodiments, the polysiloxane is a functional polysiloxane.

In some embodiments, the functional polysiloxane is dihydroxypolydimethylsiloxane having a viscosity at 25° C. of about 90 cSt. Such polysiloxanes can be characterized as low viscosity polysiloxane fluids functionalized with hydroxyl end groups.

Non-limiting examples of commercially available low viscosity polysiloxane fluids functionalized with hydroxyl end groups include the TEGOMER H-Si 2315 brand and grade designation available from Evonik.

In some embodiments, the functional polysiloxane is a polyester modified polysiloxane having a melting point of about 54° C. Such polysiloxanes can be characterized as solid (at room temperature) polyester modified polysiloxanes.

Non-limiting examples of commercially available solid polyester modified polysiloxanes include the TEGOMER H-Si 6441 P brand and grade designation available from Evonik.

In embodiments of the invention in which the polysiloxane is a functional polysiloxane, the polysiloxane is generally present in an amount ranging from about 0.5 to about 5 weight percent by weight of the thermoplastic elastomer compound. In certain embodiments of the invention in which the polysiloxane is functional polysiloxane, the polysiloxane is generally present in an amount ranging from about 0.5 to about 3 weight percent by weight of the thermoplastic elastomer compound.

Optional Secondary Elastomer

In some embodiments, thermoplastic elastomer compounds include secondary elastomer.

Suitable secondary elastomers include conventional or commercially available elastomeric materials. A secondary elastomer can be used alone or in combination with one or more other secondary elastomers.

Non-limiting examples of thermoplastic elastomers suitable for use in the present invention include styrenic block copolymers (SBC), polyolefin elastomers (POE), thermoplastic vulcanizates (TPV), thermoplastic silicone vulcanizates (TPSiV), and combinations thereof.

In some embodiments, the styrenic block copolymer is selected from styrene-ethylene/butylene-styrene (SEBS) block copolymer, styrene-ethylene/propylene-styrene (SEPS) block copolymer, styrene-ethylene/ethylene/propylene-styrene (SEEPS) block copolymer, styrene-isobutylene-styrene (SIBS) block copolymer, styrene-butadiene-styrene (SBS) block copolymer, styrene-isoprene-styrene (SIS) block copolymer, and combinations thereof.

In some embodiments, the polyolefin elastomer is selected from propylene-based elastomers, ethylene/α-olefin random copolymers, olefin block copolymers, and combinations thereof.

Optional Additives

In some embodiments, the thermoplastic elastomer compound includes one or more optional additives.

Suitable optional additive include conventional or commercially available plastics additives. Those skilled in the art of thermoplastics compounding, without undue experimentation, can select suitable additives from available references, for example, E. W. Flick, "Plastics Additives Database," *Plastics Design Library* (Elsevier 2004).

Optional additives can be used in any amount that is sufficient to obtain a desired processing or performance property for the thermoplastic elastomer compound and/or the overmolded thermoplastic article. The amount should not be wasteful of the additive nor detrimental to the processing or performance of the thermoplastic elastomer compound and/or the thermoplastic article.

Non-limiting examples of additives suitable for use in the present invention include one or more selected from antioxidants and stabilizers; colorants; plasticizers; and ultraviolet light absorbers.

In some embodiments, the thermoplastic elastomer compound of the present invention is free of wax. Although wax is commonly used as a mold release agent with conventional TPU compounds, it is believed that wax is a cause of blooming. Acceptable mold release can be achieved for thermoplastic articles molded from the thermoplastic elastomer compounds of the present invention, even in the absence of wax as a mold release agent.

Ranges of Ingredients in the TPE Compounds

Table 1 below shows the acceptable, desirable, and preferable ranges of ingredients for various embodiments of the thermoplastic elastomer compounds of the present invention in terms of weight percent based on total weight of the thermoplastic elastomer compound. Other possible ranges of ingredients for certain embodiments of the present invention are as described elsewhere herein.

Thermoplastic elastomer compounds of the present invention can comprise, consist essentially of, or consist of these ingredients. Any number between the ends of the ranges is also contemplated as an end of a range, such that all possible combinations are contemplated within the possibilities of Table 1 as embodiments of compounds for use in the present invention. Unless expressly stated otherwise herein, any disclosed number is intended to refer to both exactly the disclosed number and "about" the disclosed number, such that either possibility is contemplated within the possibilities of Table 1 as embodiments of compounds for use in the present invention.

TABLE 1

| Thermoplastic Elastomer Compound (wt. %) | | | |
|---|---|---|---|
| Ingredient | Acceptable | Desirable | Preferable |
| Thermoplastic Polyurethane | 40 to 99.9 | 50 to 93.8 | 70 to 86.5 |
| Polysiloxane | 0.1 to 5 | 0.2 to 4 | 0.5 to 3 |
| Optional Secondary Elastomer | 0 to 45 | 5 to 39 | 10 to 21 |
| Optional Additives | 0 to 10 | 1 to 7 | 3 to 6 |

Processing

Preparation of the thermoplastic elastomer compounds of the present invention is uncomplicated once the proper ingredients have been selected. The compounds can be made in batch or continuous operations.

Mixing in a continuous process typically occurs in an extruder that is elevated to a temperature that is sufficient to melt the polymer matrix with addition of all additives at the feed-throat, or by injection or side-feeders downstream. Extruder speeds can range from about 200 to about 700 revolutions per minute (rpm), and preferably from about 300 rpm to about 500 rpm. Typically, the output from the extruder is pelletized for later processing.

Subsequent preparation of overmolded thermoplastic articles of the present invention also is uncomplicated once thermoplastic resin compounds and thermoplastic elastomer compounds of the present invention are provided.

Overmolding processes are described in available references, for example, Jin Kuk Kim et al. (editors), *Multicomponent Polymeric Materials* (Springer 2016); Dominick V. Rosato et al., *Plastics Design Handbook* (Springer 2013); GLS Corporation, *Overmolding Guide* (2004). Typically, it is recommended for overmolding to avoid the use of mold release sprays and similar lubricants applied to the mold cavity because they can interfere with bonding between the substrate material and the overmold material.

Thermoplastic Articles

Some aspects of the invention are directed to thermoplastic articles molded from thermoplastic elastomer compounds of the present invention.

In some embodiments, the thermoplastic article has a surface and no blooming is detectable on the surface after the article is subjected to weathering according to the 4-Cycle Weathering Test. In some embodiments, no blooming is detectable by visual observation on the surface after the article is subjected to weathering according to the 4-Cycle Weathering Test. In other embodiments, no blooming is detectable by FT-IR spectroscopy on the surface after the article is subjected to weathering according to the 4-Cycle Weathering Test. In further embodiments, no blooming is detectable by both visual observation and FT-IR spectroscopy on the surface after the article is subjected to weathering according to the 4-Cycle Weathering Test.

Other aspects of the invention are directed to overmolded thermoplastic articles. Overmolded thermoplastic articles include an overmold portion molded from a thermoplastic elastomer compound of the present invention and a substrate portion molded from a thermoplastic resin compound. The overmold portion is bonded onto the substrate portion at a bond interface, and the bond interface is free of adhesive.

In some embodiments, the overmold portion has a surface and no blooming is detectable on the surface after the overmolded thermoplastic article is subjected to weathering according to the 4-Cycle Weathering Test. In some embodiments, no blooming is detectable by visual observation on the surface after the overmolded thermoplastic article is subjected to weathering according to the 4-Cycle Weathering Test. In other embodiments, no blooming is detectable by FT-IR spectroscopy on the surface after the overmolded thermoplastic article is subjected to weathering according to the 4-Cycle Weathering Test. In further embodiments, no blooming is detectable by both visual observation and FT-IR spectroscopy on the surface after the overmolded thermoplastic article is subjected to weathering according to the 4-Cycle Weathering Test.

The substrate portion of the overmolded thermoplastic article is molded from a thermoplastic resin compound. The thermoplastic resin compound includes one or more thermoplastic polymer resins. In some embodiments, the thermoplastic resin compound further includes one or more optional additives. Thermoplastic resin compounds of the present invention can comprise, consist essentially of, or consist of these ingredients.

In some embodiments, the thermoplastic resin compound includes one or more thermoplastic polymer resins in an amount of about 100 weight percent by weight of the thermoplastic resin compound. That is, in some embodiments, the thermoplastic resin compound is neat thermoplastic polymer resin. In other embodiments, the thermoplastic resin compound includes one or more thermoplastic polymer resins in an amount of, for example, at least about 50 weight percent, or at least about 75 weight percent, or at least about 90 weight percent, or at least about 99 weight percent, or at least about 99.9 weight percent, by weight of the thermoplastic resin compound, and the balance includes one or more optional additives.

Suitable thermoplastic polymer resins include conventional or commercially available thermoplastic polymer resins. A thermoplastic polymer resin can be used alone or in combination with one or more other thermoplastic polymer resins.

In some embodiments, the thermoplastic polymer resin is a thermoplastic engineering resin. Non-limiting examples of thermoplastic engineering resins suitable for use in the present invention include polycarbonates, acrylonitrile butadiene styrenes, polyamides, polystyrenes, polyesters, polyoxymethylenes, polyphenylene oxides, and alloys or blends thereof.

In some embodiments, the thermoplastic resin compound further includes one or more optional additives. Suitable optional additive include conventional or commercially available plastics additives as described above for the thermoplastic elastomer compound and any others as can be selected by those skilled in the art, provided that they are selected and used in amounts that are not wasteful nor detrimental to the processing or performance of the thermoplastic resin compound and/or the overmolded thermoplastic article.

Methods of Making Overmolded Thermoplastic Articles

Some aspects of the invention are directed to methods of making an overmolded thermoplastic article having a substrate portion and an overmold portion.

According to the invention, the method includes the steps of: (a) providing a thermoplastic elastomer compound of the present invention; (b) providing a thermoplastic resin compound; (c) molding the thermoplastic resin compound to provide the substrate portion; and (d) overmolding the thermoplastic elastomer compound to provide the overmold portion, wherein the overmold portion is bonded onto the substrate portion at a bond interface, and wherein the bond interface is free of adhesive, thereby providing the overmolded thermoplastic article.

In some embodiments, the overmolding of step (d) is performed in a mold cavity, and the mold cavity is free of a mold release spray or other lubricant including but not limited to a polysiloxane-containing mold release spray. That is, prior to the overmolding of step (d), no mold release spray or other lubricant is sprayed or otherwise applied into the mold cavity.

Overmolded thermoplastic articles made according to the methods described herein can include any combination of the features described herein for the overmolded thermoplastic articles of the present invention.

Usefulness of the Invention

According to aspects of the invention, thermoplastic elastomer compounds including thermoplastic polyurethane as the primary thermoplastic resin can be molded into thermoplastic articles which exhibit substantially no blooming after weathering, while also exhibiting good processability, useful functionality, and desirable aesthetics. The thermoplastic compounds can be especially useful for making overmolded thermoplastic articles.

Thermoplastic articles of the present invention, including overmolded thermoplastic articles of the present invention, have potential for a variety of applications in many different industries, including but not limited to: automotive and transportation; and electronics their accessories; communications; consumer products; healthcare and medical; household appliances; industrial equipment; and other industries or applications benefiting from the article's unique combination of properties.

EXAMPLES

Non-limiting examples of thermoplastic elastomer compounds of various embodiments of the present invention are provided.

Table 2 below shows sources of ingredients for the thermoplastic elastomer compounds of Comparative Examples A to B and Examples 1 to 4.

TABLE 2

| Ingredient Description | Brand | Source |
|---|---|---|
| Styrene-(ethylene/butylene)-styrene block copolymer | KRATON A1535 | Kraton Polymers |
| White oil | 380 vis oil | Multiple |
| Styrene-(isobutylene)-styrene block copolymer | SIBSTAR 103T | Kaneka |
| Aromatic polyether-type thermoplastic polyurethane | IROGRAN A85A 4394 UV | Huntsman |
| Aromatic polyester-type thermoplastic polyurethane | ELASTOLLAN S85A55N | BASF |
| Aromatic polyester-type thermoplastic polyurethane | AVALON S85ABU | Huntsman |

TABLE 2-continued

| Ingredient Description | Brand | Source |
|---|---|---|
| Aromatic polycaprolactone copolyester-type thermoplastic polyurethane | PEARLTHANE 11T85 | Lubrizol |
| Aromatic polycaprolactone copolyester-type thermoplastic polyurethane | IROGRAN A 89 E 4372 | Huntsman |
| Color concentrate | CC10190262X0 black | PolyOne |
| Stabilizer | IRGASTAB FS 301 | BASF |
| Antioxidant | IRGANOX 1010 | BASF |
| Antioxidant | IRGAFOS 168 | BASF |
| Ultraviolet light absorber | TINUVIN 234 | BASF |
| Ultraviolet light absorber | TINUVIN 622 | BASF |
| Polydimethylsiloxane | XIAMETER PMX-200, 50CS | Dow Corning |
| Polyester modified siloxane | TEGOMER H-Si 6441 P | Evonik |

Examples of the thermoplastic elastomer compound were compounded and extruded as pellets on a twin extruder at a temperature of 360° F. and a mixing speed of 300 rpm. Subsequently, test specimens were prepared by injection molding and then evaluated for the reported properties.

Shore A hardness was assessed according to ASTM D2240. Test specimens were in the form of plaques.

Crystallization temperature (Tc) was determined according to the Parallel Plate Rheometer Method. Test specimens were in the form of plaques.

Molded part appearance was assessed by visual observation. Test specimens were in the form of a complex part design representative of an overmold portion for an overmolded thermoplastic article. “Pass” was assigned when no sink marks or flash as molding defects were visually observable for a test specimen. “Fail” was assigned when sink marks or flash as molding defects were visually observable for a test specimen.

Blooming on the surface of the test specimen was assessed by both visual observation and FT-IR spectroscopy after the test specimen was subjected to weathering according to the 4-Cycle Weathering Test. Test specimens were in the form of plaques. “No” was assigned when no blooming was detected by both visual observation and FT-IR spectroscopy. “Yes” was assigned when blooming was detected by either visual observation or FT-IR spectroscopy.

Table 3 below shows the formulations and certain properties of Comparative Examples A to B and Example 1.

TABLE 3

| | Example | | | | | |
|---|---|---|---|---|---|---|
| | A | | B | | 1 | |
| Ingredient | Wt. Parts | Wt. % | Wt. Parts | Wt. % | Wt. Parts | Wt. % |
| KRATON A1535 | — | — | — | — | 6 | 5.89 |
| 380 vis oil | — | — | — | — | 4 | 3.93 |
| SIBSTAR 103T | 15 | 14.56 | 15 | 14.56 | — | — |
| IROGRAN A85A 4394 UV | — | — | — | — | 88 | 86.37 |
| ELASTOLLAN S85A55N | 84 | 81.53 | — | — | — | — |
| AVALON S85ABU | — | — | 84 | 81.53 | — | — |
| PEARLTHANE 11T85 | — | — | — | — | — | — |
| IRGOGRAN A 89 E 4372 | — | — | — | — | — | — |
| CC10190262X0 black | 1 | 0.97 | 1 | 0.97 | 2 | 1.96 |
| IRGASTAB FS 301 | 0.1 | 0.10 | 0.1 | 0.10 | — | — |
| IRGANOX 1010 | — | — | — | — | 0.15 | 0.15 |
| IRGAFOS 168 | — | — | — | — | 0.1 | 0.10 |
| TINUVIN 234 | 0.62 | 0.60 | 0.62 | 0.60 | 0.31 | 0.30 |
| TINUVIN 622 | 0.31 | 0.30 | 0.31 | 0.30 | 0.31 | 0.30 |
| XIAMETER PMX-200, 50CS | — | — | — | — | 1.02 | 1.00 |
| TEGOMER H-Si 6441 P | 2 | 1.94 | 2 | 1.94 | — | 1 |
| TOTAL | 103.03 | 100.00 | 103.03 | 100.00 | 101.89 | 100.00 |
| Properties | | | | | | |
| Hardness (Shore A) (ASTM D2240) | 77 | | 77 | | 78 | |
| Crystallization Temp., Tc (° C.) | 170 | | 165 | | 145 | |
| Molded Part Appearance | Pass | | Pass | | Fail | |
| Blooming | Yes | | Yes | | No | |

Table 4 below shows the formulations and certain properties of Examples 2 to 4.

TABLE 4

| | Example | | | | | |
|---|---|---|---|---|---|---|
| | 2 | | 3 | | 4 | |
| Ingredient | Wt. Parts | Wt. % | Wt. Parts | Wt. % | Wt. Parts | Wt. % |
| KRATON A1535 | — | — | — | — | — | — |
| 380 vis oil | — | — | — | — | — | — |
| SIBSTAR 103T | 15 | 14.56 | 15 | 14.56 | 15 | 14.63 |
| IROGRAN A85A 4394 UV | — | — | — | — | — | — |
| ELASTOLLAN S85A55N | — | — | — | — | — | — |
| AVALON S85ABU | — | — | — | — | — | — |
| PEARLTHANE 11T85 | 84 | 81.53 | — | — | — | — |
| IRGOGRAN A 89 E 4372 | — | — | 84 | 81.53 | 84 | 81.93 |
| CC10190262X0 black | 1 | 0.97 | 1 | 0.97 | 1 | 0.98 |
| IRGASTAB FS 301 | 0.1 | 0.10 | 0.1 | 0.10 | 0.1 | 0.10 |
| IRGANOX 1010 | — | — | — | — | — | — |
| IRGAFOS 168 | — | — | — | — | — | — |
| TINUVIN 234 | 0.62 | 0.60 | 0.62 | 0.60 | 0.62 | 0.60 |
| TINUVIN 622 | 0.31 | 0.30 | 0.31 | 0.30 | 0.31 | 0.30 |
| XIAMETER PMX-200, 50CS | — | — | — | — | 1.5 | 1.46 |
| TEGOMER H-Si 6441 P | 2 | 1.94 | 2 | 1.94 | — | — |
| TOTAL | 103.03 | 100.00 | 103.03 | 100.00 | 102.53 | 100.00 |
| Properties | | | | | | |
| Hardness (Shore A) (ASTM D2240) | 79 | | 78 | | 78 | |
| Crystallization Temp., Tc (° C.) | 170 | | 190 | | 190 | |
| Molded Part Appearance | Pass | | Pass | | Pass | |
| Blooming | No | | No | | No | |

Without undue experimentation, those having ordinary skill in the art can utilize the written description, including the Examples, to make and use thermoplastic elastomer compounds and thermoplastic articles according to the present invention.

All documents cited in the Embodiments of the Invention are incorporated herein by reference in their entirety unless otherwise specified. The citation of any document is not to be construed as an admission that it is prior art with respect to the present invention.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of the present invention.

What is claimed is:

1. A thermoplastic elastomer compound consisting of:

(a) at least about 80 weight percent, by weight of the compound, of polycaprolactone-type thermoplastic polyurethane;

(b) more than 1 weight percent and at most about 5 weight percent, by weight of the compound, of polysiloxane;

(c) optionally at most about 21 weight percent, by weight of the compound, of a secondary elastomer, wherein the secondary elastomer is selected from the group consisting of styrenic block copolymers, polyolefin elastomers, and combinations thereof; and (d) optionally at most about 10 weight percent, by weight of the compound, of an additive, wherein the additive is selected from one or more of the group consisting of antioxidants and stabilizers; colorants; ultraviolet light absorbers; and combinations thereof, and wherein the compound has a crystallization temperature of at least about 150° C. according to the Parallel Plate Rheometer Method.

2. The thermoplastic elastomer compound of claim 1, wherein the compound has a crystallization temperature from about 165 to about 195° C. according to the Parallel Plate Rheometer Method.

3. The thermoplastic elastomer compound of claim 1, wherein the polycaprolactone-type thermoplastic polyurethane is selected from aromatic thermoplastic polyurethane, aliphatic thermoplastic polyurethane, and combinations thereof.

4. The thermoplastic elastomer compound of claim 1, wherein the polycaprolactone-type thermoplastic polyurethane is selected from aromatic thermoplastic polyurethane.

5. The thermoplastic elastomer compound of claim 1, wherein the polysiloxane is selected from non-functional polysiloxanes, functional polysiloxanes, and combinations thereof.

6. The thermoplastic elastomer compound claim 1, wherein the polysiloxane is selected from the group consisting of non-functional polydimethylsiloxane having a viscosity at 25° C. of about 50 cSt or less, polyester modified polysiloxane having a melting point of about 54° C., and combinations thereof.

7. The thermoplastic elastomer compound of claim 1, wherein the polycaprolactone-type thermoplastic polyurethane has a first hardness, the secondary elastomer has a second hardness, and the compound has a third hardness, wherein the first hardness is greater than the second hardness, and wherein the third hardness is less than the first hardness and greater than the second hardness.

8. The thermoplastic elastomer compound of claim 1, wherein the compound has a Shore A hardness of less than about 90 according to ASTM D2240.

9. The thermoplastic elastomer compound of claim 1, wherein the polysiloxane is present in an amount ranging from about 1.5 to about 3 weight percent by weight of the compound.

10. The thermoplastic elastomer compound of claim 1, wherein the compound is free of wax.

11. A thermoplastic article molded from the thermoplastic elastomer compound of claim 1.

12. The thermoplastic article of claim 11, wherein the article has a surface and no blooming is detectable on the surface after the article is subjected to weathering according to the 4-Cycle Weathering Test.

13. An overmolded thermoplastic article comprising:

(a) an overmold portion molded from the thermoplastic elastomer compound of claim 1; and (b) a substrate portion molded from a thermoplastic resin compound comprising thermoplastic polymer resin;

wherein the overmold portion is bonded onto the substrate portion at a bond interface, and the bond interface is free of adhesive.

14. The overmolded thermoplastic article of claim 13, wherein the overmold portion has a surface and no blooming is detectable on the surface after the article is subjected to weathering according to the 4-Cycle Weathering Test.

15. A method of making an overmolded thermoplastic article having a substrate portion and an overmold portion, the method comprising the steps of:

(a) providing the thermoplastic elastomer compound of claim 1;

(b) providing a thermoplastic resin compound comprising thermoplastic polymer resin;

(c) molding the thermoplastic resin compound to provide the substrate portion; and (d) overmolding the thermoplastic elastomer compound to provide the overmold portion, wherein the overmold portion is bonded onto the substrate portion at a bond interface, and wherein the bond interface is free of adhesive, thereby providing the overmolded thermoplastic article.

* * * * *